United States Patent
Samuelsson et al.

(10) Patent No.: US 8,757,919 B2
(45) Date of Patent: Jun. 24, 2014

(54) COMPONENT AND A GAS TURBINE ENGINE COMPRISING THE COMPONENT

(75) Inventors: Rickard Samuelsson, Trollhättan (SE); Niklas Jansson, Mölndal (SE)

(73) Assignee: Volvo Aero Corporation, Trollhättan (SE)

( * ) Notice: Subject to any disclaimer, the term of this patent is extended or adjusted under 35 U.S.C. 154(b) by 252 days.

(21) Appl. No.: 13/061,156

(22) PCT Filed: Aug. 29, 2008

(86) PCT No.: PCT/SE2008/000487
§ 371 (c)(1),
(2), (4) Date: Mar. 16, 2011

(87) PCT Pub. No.: WO2010/024736
PCT Pub. Date: Mar. 4, 2010

(65) Prior Publication Data
US 2011/0299917 A1    Dec. 8, 2011

(51) Int. Cl.
*F16D 1/00* (2006.01)
(52) U.S. Cl.
USPC ........................................ 403/337; 403/408.1
(58) Field of Classification Search
USPC .............. 403/150, 151, 154, 156, 157, 408.1, 403/337; 415/208.2, 209.2, 209.3, 209.4
See application file for complete search history.

(56) References Cited

U.S. PATENT DOCUMENTS 2,742,770 A * 4/1956 Graham ........................ 403/337
4,435,100 A * 3/1984 Cox .............................. 403/151

(Continued)

FOREIGN PATENT DOCUMENTS

| DE | 4312343 A1 | | 10/1994 | |
|---|---|---|---|---|
| EP | 1129942 A2 | | 9/2001 | |
| WO | WO 2007/107520 | * | 9/2007 | ................ F16B 2/04 |
| WO | 2008121047 A1 | | 10/2008 | |

OTHER PUBLICATIONS

International Search Report for corresponding international Application PCT/SE2008/000487.

(Continued)

*Primary Examiner* — Michael P Ferguson
(74) *Attorney, Agent, or Firm* — WRB-IP LLP

(57) ABSTRACT

A component includes a first member, a second member and a device for fastening the first member to the second member. A first hole extends through a portion of the first member and a second hole extends through a portion of the second member. The first member and the second member are positioned such that the first hole and the second hole coincide. The fastening device includes an elongated fastening element arranged in the coinciding holes and a bushing arrangement arranged around the fastening element and adapted to establish a load transmission path between the first member and the second member. A first part of the bushing arrangement is arranged such that an inner surface thereof is positioned at a distance from an exterior surface of the fastening element for establishing a first load transmission path via the bushing arrangement and bypassing the fastening element in a first load condition. Further, the fastening device is adapted to allow the first member to move relative to the fastening element in a second load condition such that the first part of the bushing arrangement can be brought into contact with the fastening element for establishing a second load transmission path between the first member and the second member via the fastening element.

14 Claims, 5 Drawing Sheets

(56) References Cited

U.S. PATENT DOCUMENTS

| | | | |
|---|---|---|---|
| 4,444,365 A * | 4/1984 | Heuberger | 403/408.1 |
| 4,453,488 A * | 6/1984 | Watchorn | 403/337 |
| 4,889,458 A * | 12/1989 | Taylor | 403/156 |
| 5,180,282 A | 1/1993 | Lenhart et al. | |
| 5,224,341 A | 7/1993 | Munroe et al. | |
| 5,272,889 A | 12/1993 | Dawson et al. | |
| 5,277,382 A | 1/1994 | Seelen et al. | |
| 5,292,227 A * | 3/1994 | Czachor et al. | 415/209.3 |
| 5,320,490 A | 6/1994 | Corbin et al. | |
| 5,848,874 A * | 12/1998 | Heumann et al. | 415/209.2 |
| 5,855,462 A * | 1/1999 | Weiss | 411/383 |
| 6,330,995 B1 | 12/2001 | Mangeiga et al. | |
| 7,794,203 B2 * | 9/2010 | Drelon et al. | 415/209.4 |
| 2006/0233642 A1 * | 10/2006 | Wunderlich et al. | 415/209.2 |

OTHER PUBLICATIONS

International Preliminary Report on Patentability for corresponding International Application PCT/SE2008/000487.

Supplementary European Search Report (May 17, 2013) for corresponding European App. EP 08 79 4113.

* cited by examiner

COMPONENT AND A GAS TURBINE ENGINE COMPRISING THE COMPONENT

BACKGROUND AND SUMMARY

The present invention relates to a component comprising a first member, a second member and a device for fastening the first member to the second member, wherein a first hole extends through a portion of the first member and a second hole extends through a portion of the second member, wherein the first member and the second member are positioned such that the first hole and the second hole coincide, wherein the fastening device comprises an elongated fastening element arranged in said coinciding holes and a bushing arrangement arranged around the fastening element and adapted to establish a load transmission path between the first member and the second member.

The inventive component is particularly suitable for application in a gas turbine engine. Especially, the gas turbine component is configured for a static application in the gas turbine engine. In such a gas turbine component, the first member forms a radially extending arm, or vane and the second member forms a ring element. The arm is attached to the ring element via at least one and preferably a plurality of said fastening devices. More specifically, the gas turbine component comprises a plurality of circumferentially spaced arms extending in a radial direction of the ring element. In the gas turbine component, the vanes may be structural, or load carrying, and/or designed for an aerodynamic function. The invention also relates to a gas turbine engine comprising such a component.

Furthermore, the invention is particularly advantageous for components of turbojet engines by which the above-mentioned arms comprise an anisotropic material, such as a composite material and typically a fibre-reinforced polymer.

Turbojet engines may comprise a fan part that comprises a channel defined by an outer ring, or outer casing, and an inner ring, or inner casing. There is also a plurality of guide vanes and structural vanes extending in a radial direction between the outer ring and the inner ring. There is also provided an engine mount by means of which the engine is to be suspended in a frame, preferably a wing, of an aircraft. Thereby, the engine mount may be attached to the above-mentioned outer ring. For the purpose of saving weight some of the above-mentioned components, such as the guide vanes, the inner ring and the outer ring may be made of a composite material such as a fibre-reinforced polymer.

Typically, a structure like the one mentioned above will be subjected to large mechanical forces in many directions upon operation of the engine. When a material such as a fibre-reinforced polymer is used in such a vane, it will present a high ability of absorbing forces, i.e. a high tensile strength, in the lengthwise direction of the fibres. Typically, the fibres are oriented in a plane. More specifically, there may be four fibre directions in the plane. However, when and where a bending force is to be absorbed by the vane in a joint to another, the ability of absorbing said force will be heavily reduced due to the incapacity of said material when it comes to the absorption of forces in a direction cross-wise to the fibre plane. Specifically, a joint between a vane with said arrangement of the fibres in a fibre plane and the outer ring would have a low ability of absorbing a force in a direction cross-wise to the fibre plane. In other words, the bending rigidity of such a material is relatively low. In this respect the material presents a rather remarkable anisotropy.

Typically, a bolt or rivet connection is used for joining the vane to the ring element. In order to utilize the strength of the composite material, the connection between the vane and the ring element has to be as good as possible, preferably a tight fit and ideally into a reamed hole. One way of achieving a good fit between the bolt and the hole is to drill the holes simultaneously. However, it has a drawback in that the parts will be unique and generally not replaceable. Further, the machining operation may be complex in case one part is in metal and another in composite. A further problem for components with a general geometry tolerance is that there will be tolerance chain when several parts are interconnected or when the bolt connection comprises several bolts. Thus, there is a desire to achieve a component fabricated by connection of two members (vane and ring element), wherein a sum of the individual, achievable tolerances is within the general tolerance requirements, while still maintaining the load-carrying ability.

Further, there are requirements for structural integrity with regard to ultimate load cases for a primary load carrying structure in an aircraft engine. Therefore, friction joints are normally avoided. Further, a friction joint requires that large clamp forces are generated. With regard to composites, they have a tendency to relax mechanically during its lifetime, wherein a pretension and the friction force may disappear.

It is desirable to achieve a component, which comprises a joint between a first member (such as a vane) and a second member (such as a ring element), which component is configured to withstand ari ultimate load case and configured for an efficient manufacturing while obtaining set tolerance requirements.

According to an aspect of the present invention, a component is characterized in that a first part of the bushing arrangement is arranged such that an inner surface thereof is positioned at a distance from an exterior surface of the fastening element for establishing a first load transmission path via the bushing arrangement and bypassing the fastening element in a first load condition and that the fastening device is adapted to allow the first member to move relative to the fastening element in a second load condition such that the first part of the bushing arrangement can be brought into contact with the fastening element for establishing a second load transmission path between the first member and the second member via the fastening element.

Thus, the component is configured for the first load transmission path in the first load condition (normal operation) and the second load transmission path in the second load condition (extreme load case). More specifically, the bushing arrangement is adapted to transmit the load in the normal load case (preferably via friction) and the fastening element (normally a bolt) only transmits load in the extreme load case (there is a gap between the bushing arrangement and the fastening element in the normal load case). In this way, the required tolerances between the interconnected parts can be achieved easily in a manufacturing step. The invention further creates conditions for arranging the bushing arrangement with a tight fit in the preferably reamed hole(s), wherein a proper load transmission can be achieved between the first member (preferably in composite material) and the bushing arrangement, while a larger tolerance between the fastening element (normally a bolt) and the bushing arrangement results in that problems with tolerance series are eliminated or at least relieved. Further, the component is especially suitable for comprising composites of fibre-reinforced polymers.

According to one embodiment, said first part of the bushing arrangement comprises a first bushing with a tight fit relative to the first member. Thus, the component is configured for achieving the first load transmission path via a friction connection in the normal load case. Especially, the first bushing can be arranged with a tight fit in the associated hole, wherein a proper load transmission can be achieved between the first member (preferably in composite material) and the first bushing, while a larger tolerance between the fastening element (normally a bolt) and the first bushing arrangement results in that problems with tolerance chains are eliminated or at least relieved.

According to a further embodiment, the bushing arrangement comprises a second bushing with a tight fit or in direct contact relative to the second member. This design creates conditions for achieving a load transmission path between the second member (such as a ring element) and the second bushing via friction. Especially, the second bushing can be arranged with a tight fit or in direct contact in the associated hole, wherein a proper load transmission can be achieved between the second member (preferably a ring element) and the second bushing, while a larger tolerance between the fastening element (normally a bolt) and the second bushing arrangement results in that problems with tolerance series are eliminated or at least relieved.

According to a further embodiment, the second bushing is arranged in such a manner relative to the first bushing that the first load transmission path extends through both of them in the first load case. Thus, the first and second bushings are arranged relative to one another such that a load can be transmitted between them. Thus, in the first load condition, the load can be transmitted between the first and second bushing and bypassing the fastening element. According to an example, the second bushing is positioned in frictional contact with the first bushing for movement in unison with the first bushing in the first load case. The frictional connection creates conditions for an easy mounting and/or simple assembly and long life of the component.

According to a further embodiment, the fastening device comprises means for maintaining the first and second member in a desired relative position in an axial direction of the fastening element via engagement with the fastening element. Especially, the fastening device can be configured for achieving a pre-tension of the first and second member. Preferably, the elongated fastening element is formed by a bolt and that the fastening means is formed by a nut.

According to a further embodiment, the component comprises a support member for fastening the first member to the second member, wherein a hole extends through a portion of the support member, wherein the hole coincides with the holes in the first and second member, wherein said elongated fastening element is arranged also in said hole in the support member and wherein the support member is positioned on the opposite side of the first member relative to the second member in an axial direction of the fastening element. This embodiment creates further conditions for using composite materials in the first and/or second member. Such a support member can for example be formed by a metal bracket.

According to a further embodiment, the bushing arrangement comprises a third bushing with a tight fit or in direct contact relative to the support member. The third bushing is preferably arranged in a similar manner relative to the first bushing as the second bushing is.

Further features of the present invention will be presented in the following detailed description.

BRIEF DESCRIPTION OF THE DRAWINGS

A preferred embodiment of the invention will now be described more in detail, by way of example, with reference to the annexed drawing, on which.

DETAILED DESCRIPTION

Figure 1:
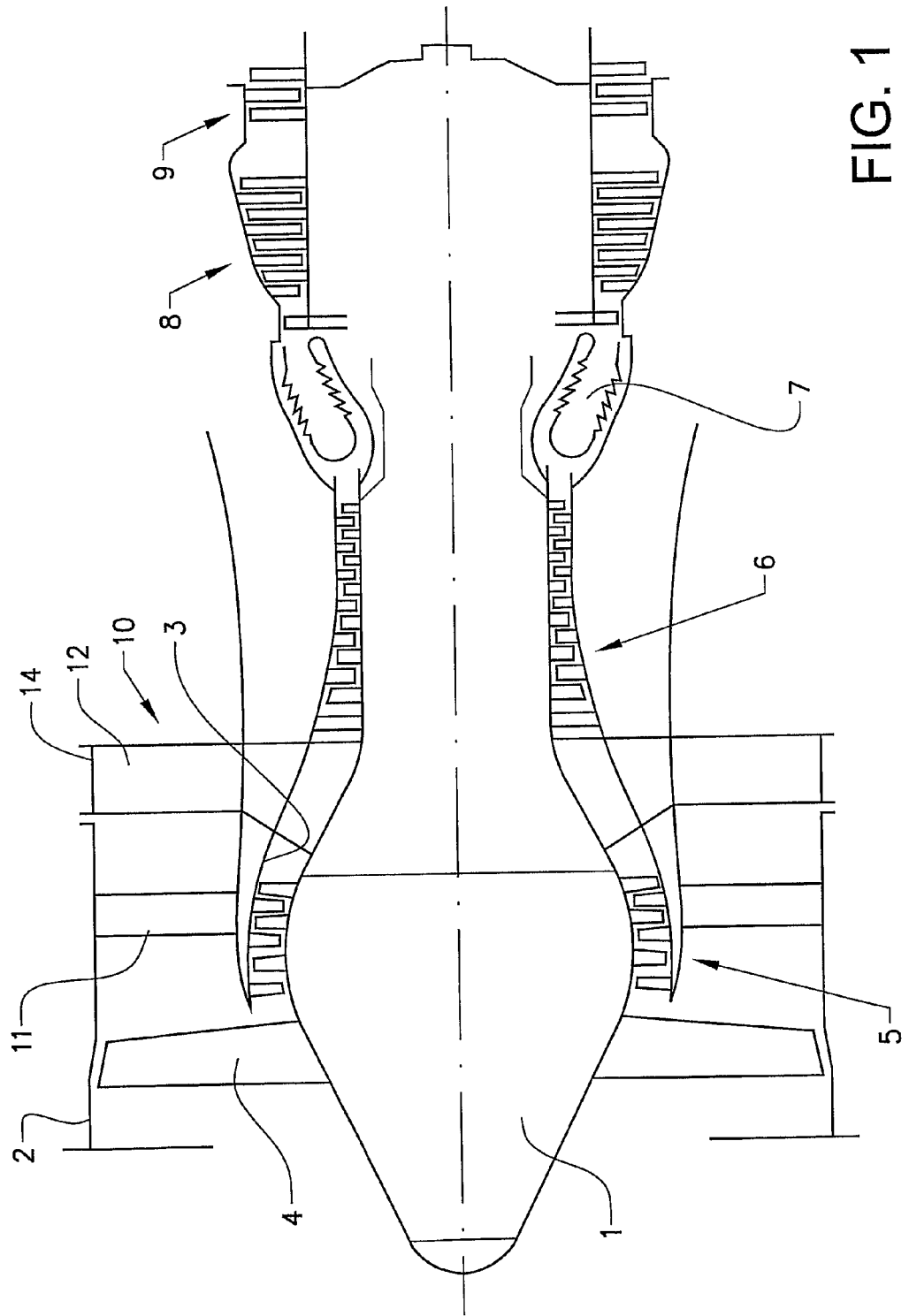
FIG. 1 is a schematic side view of a turbojet engine according to the invention.

FIG. 1 shows a turbojet engine. The turbojet engine comprises a central body 1, an annular outer casing 2 (fan casing), an annular inner casing 3 (engine casing), a fan or blower 4, a low pressure compressor 5, a high pressure compressor 6, a combustion chamber 7, a high pressure turbine 8 and a low pressure turbine 9. It further comprises a set of arms 10 extending in a radial direction from the inner casing 3 to the outer casing 2. The arms 10 comprise aerodynamic vanes 11 primarily provided to act as guide vanes for air passing through the annular channel between the inner casing 3 and the outer casing 2 in an axial direction, i.e. a longitudinal direction, of the engine. The arms 10 further comprise structural arms or load carrying vanes 12 primarily provided to guarantee a certain mechanical strength of the construction. Here, the aerodynamic vanes 11 and the load carrying vanes 12 are arranged in axially separated sets of arms. However, they could as well be arranged in an interleaving relation in one and the same set of arms. Further, a single arm may have both an aerodynamic function and a load carrying function.

The flow through the turbojet engine is divided into two major streams, a first one of which passes through an annular channel between the central body 1 and the inner casing 3, and passes the compressors 5, 6, the combustion chamber 7 and the turbines 8, 9. A second stream passes through the annular channel between the inner casing 3 and the outer casing 2. A temperature of the second stream is in operation lower than a temperature of the first stream, but the second stream substantially increases the thrust of the turbojet engine. There is also provided an engine mount 13 (see FIG. 2) by means of which the turbojet engine is attached to and held in position in relation to an aircraft.

Figure 2:
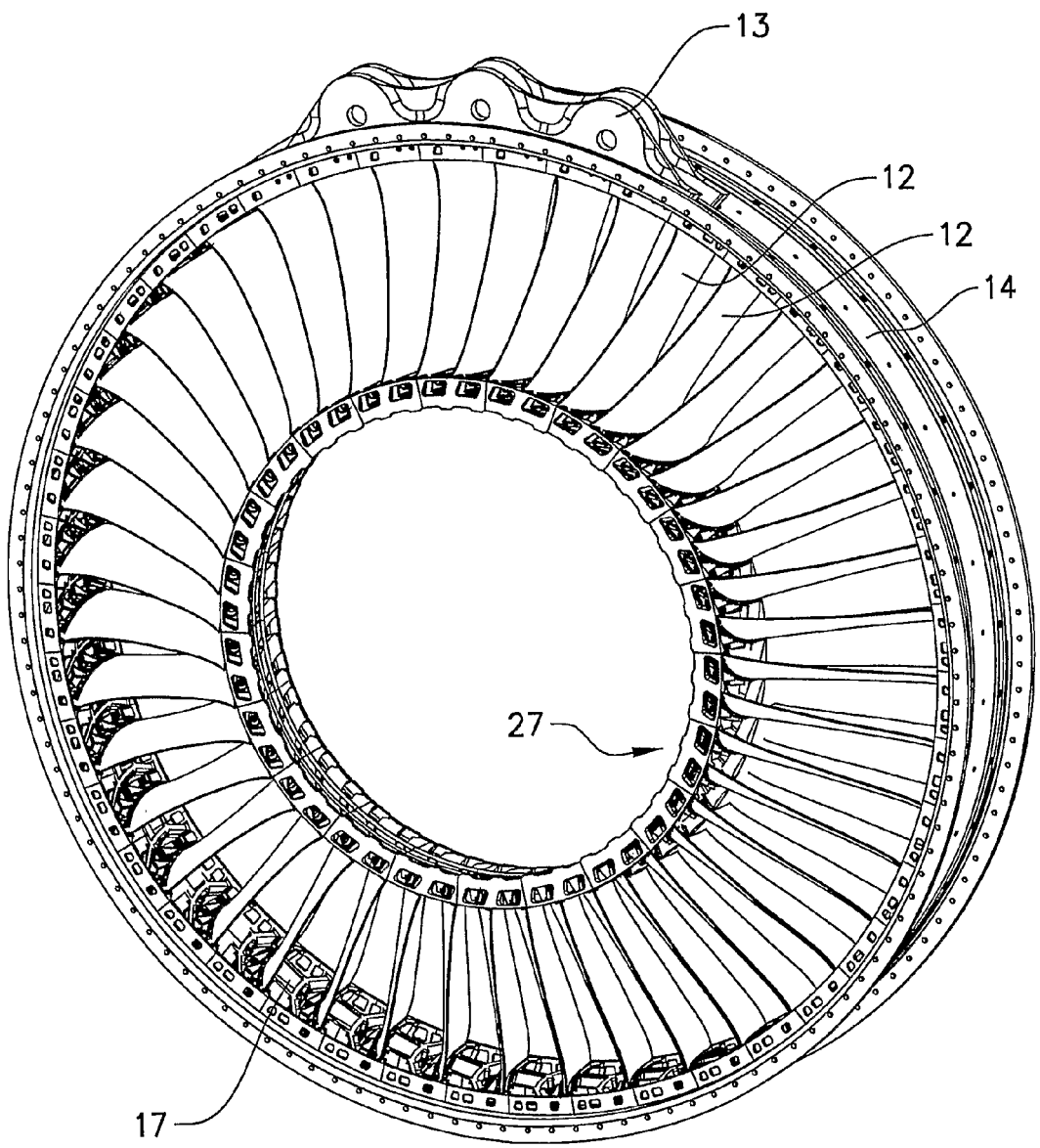
FIG. 2 shows a gas turbine engine component according to a first embodiment in a perspective view.
Figure 3:
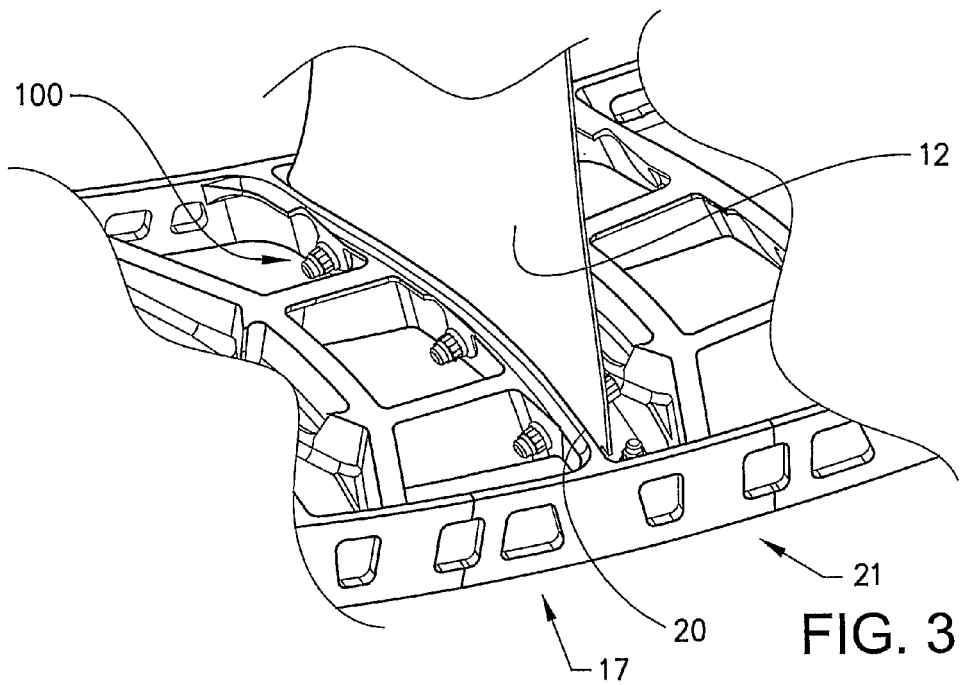
FIG. 3-4 show an attachment device for attaching a load carrying vane to an outer ring element of the gas turbine component in FIG. 2 in two different perspective views.
Figure 4:
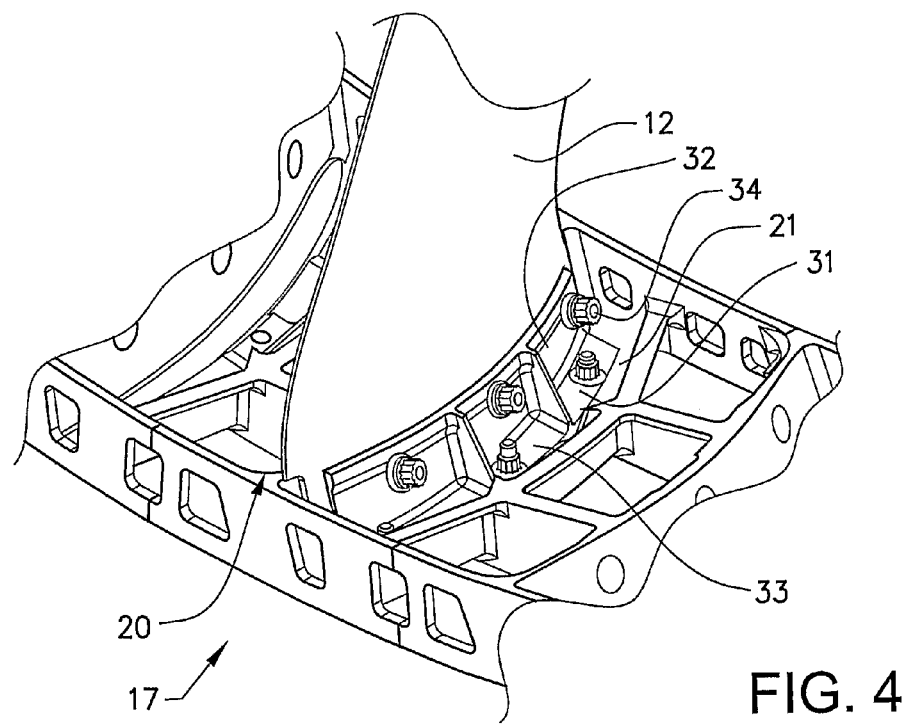

With reference now to FIG. 2 to FIG. 4, a first embodiment of a gas turbine engine component shall now be discussed more in detail. The component comprises at least one first member 12 in the form of a vane. More specifically, the component comprises an outer ring 14, which forms part of the outer casing 2 and a plurality of circumferentially spaced load carrying vanes 12 extending in a radial direction of the outer ring and between the outer ring and the inner casing 3 (see FIG. 1). FIG. 2 further shows the engine mount 13. The outer ring 14 comprises a wall structure in the form of a sheet with main surfaces facing in a radial direction.

At least some of the load carrying vanes 12, preferably a major part thereof, have an internal structure with an anisotropic load carrying property, and wherein the internal structure is configured so that a main load carrying direction is in parallel with, or at least close to parallel with, the extension direction of the load carrying vane 12. The extension direction of the load carrying vane 12 coincides with a radial direction of the component. However, according to an alternative, the load carrying vane may be arranged with an inclination (preferably <30°) in relation to the radial direction of the component. The load carrying vane 12 preferably comprises a composite material comprising a plurality of fibres extending in a plane in parallel with the extension direction of the load carrying vane 12 for establishing the main load carrying direction in parallel with the extension direction of the load carrying vane 12.

Especially, at least some of the load carrying vanes 12, preferably a major part thereof, are made of a fibre-reinforced light weight polymer material, with a density below that of, for example, light weight metals such as aluminium and titanium. Preferably, the fibres extend in a plane mainly in parallel with the longitudinal direction of the load carrying vanes 12, thereby contributing to a high tensile strength of the load carrying vanes 12 in the radial direction. A preferred fibre material of the fibre-reinforced composite is carbon fibre. The load carrying vanes 12 may further have an aerodynamically adapted cross-section, with a leading upstream edge and a trailing downstream edge as seen in the axial direction, i.e. the flow direction through the channel between the outer ring 14 and the inner casing 3.

The component further comprises a second member 17 in the form of a ring element, and more specifically an outer stiffening structure 17. The outer stiffening structure 17 is adapted to bridge the distance between at least two adjacent load carrying vanes 12 in the circumferential direction of the ring 14. The stiffening structure 17 defines a structural member to which the load carrying vanes 12 are attached. More specifically, the stiffening structure 17 forms a framework adapted for attachment of said load carrying vanes 12. The stiffening structure 17 is adapted to form a rigid support for the load carrying vane end. The stiffening structure 17 is further adapted to transfer loads in the longitudinal direction of the load carrying vanes 12 to a circumferential direction in the stiffening structure. The stiffening structure 17 is positioned on a radial interior side of the outer ring 14 and is connected to the outer ring 14.

The stiffening structure 17 preferably has an internal structure with an isotropic load carrying property. More specifically, the stiffening structure 17 is adapted for a higher bending strength than the load carrying vane 12. The stiffening structure 17 is preferably formed by a metallic material.

The outer ring 14 has an internal structure with an anisotropic load carrying property, and wherein the internal structure is configured so that a main load carrying direction is in parallel with the axial direction of the ring. The ring 14 preferably comprises a composite material comprising a plurality of fibres extending in a plane in parallel with the extension direction of the ring 14 for establishing the main load carrying direction in parallel with the extension direction of the ring 14.

In a preferred embodiment, the outer ring 14 comprises a light weight material such as a fibre-reinforced composite, preferably a fibre-reinforced polymer, the fibre preferably being carbon fibre and preferably extending in the circumferential direction of the outer ring, thereby contributing to a high tensile strength in the axial direction thereof. The outer ring 14 may, as in the shown embodiment, be of annular shape and may have a length in the longitudinal, i.e. axial direction of the engine corresponding to the extension of each of the arms 12 in said axial direction.

The connection between the stiffening structure 17 and the outer ring 14 does not necessarily need to be a rigid connection for transmission of loads. More specifically, according to the first embodiment, the stiffening structure 17 is connected to the ring 14 via position fixing means, which is adapted to only fix their mutual positions. Said position fixing means may be constituted by circumferentially (and axially) spaced small bolts. The ring 14 may further be configured for transferring axial loads between upstream and downstream gas turbine components.

FIGS. 3-4 show the design of the outer stiffening structure 17 in more detail in a perspective view. The outer stiffening structure 17 forms a framework adapted for attachment of said load carrying vanes 12. More specifically, the stiffening structure 17 comprises a wall structure with a plurality of sets of attachment portions 20, 21, wherein the sets are spaced in the circumferential direction of the stiffening structure such that they match the distance between the load carrying vanes 12. Each set of attachment portions comprises a first wall portion 20 extending in a radial direction of the stiffening structure and a second wall portion 21 extending in the extension direction of the stiffening structure. The first wall portion 20 is configured for being positioned in a parallel, overlapping relationship with the outer end of the load carrying vane 12 and configured for a rigid attachment of the load carrying vane 12.

The component comprises at least one device 100 for fastening the first member 12 (the vane) to the second member 17 (the outer stiffening structure). The component further comprises at least one support member 31. Each support member 31 is adapted to connect one of said load carrying vanes 12 to the attachment portions 20, 21 of the stiffening structure 17. The support member 31 comprises two plate portions, which in cross section extend substantially at right angles to each other. The support member 31 forms a one-piece unit in the form of a bracket. In other words, the support member 31 has a cross sectional form of an L. A first plate portion 32 is configured to be positioned in parallel to and along the first wall portion 20 so that the load carrying vane end will be positioned between them. The load carrying vane 12 can now be secured to the stiffening structure by means of the support member 31 and the fastening device 100. More specifically, a plurality of fastening devices is arranged for connecting each individual first member 12 to the second member 17 via the radial plate portion 32 of the support member 31.

Figure 5:
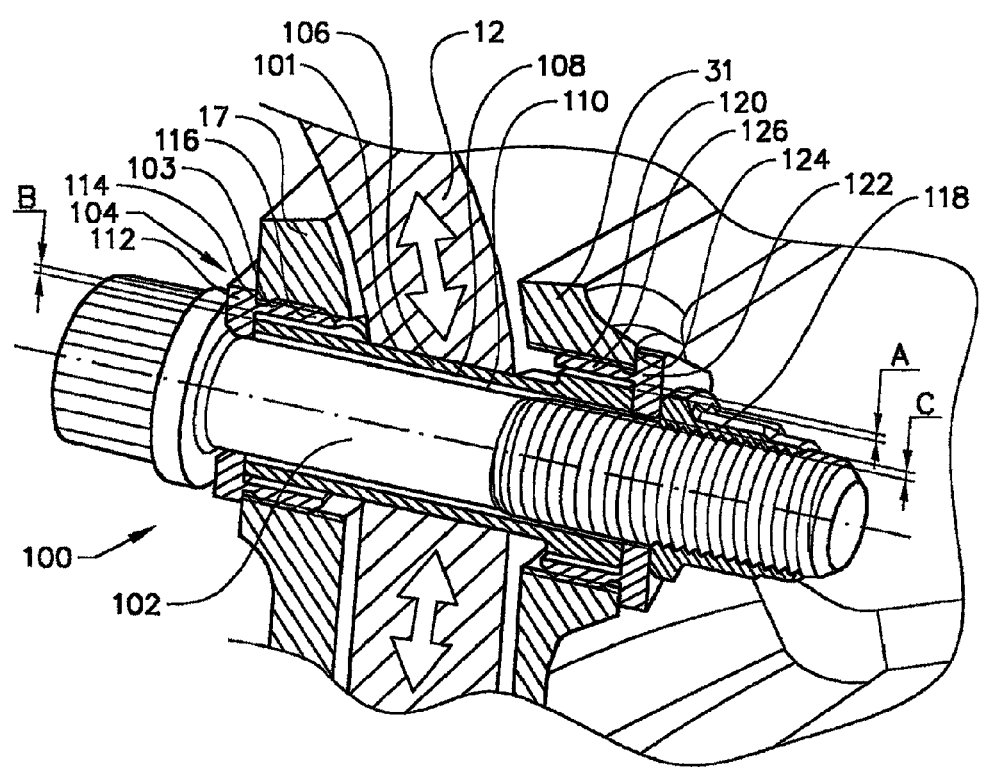
FIG. 5-7 show a single attachment point in the attachment device in FIG. 4 in partly cut, cross sectional views.
Figure 7:
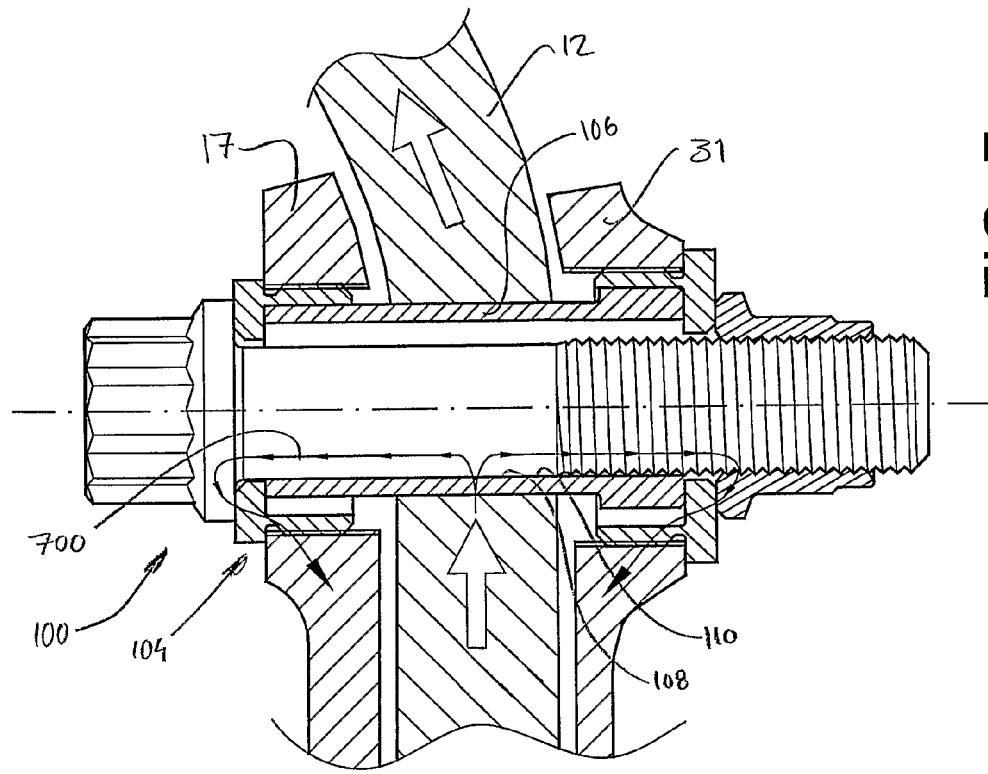
Figure 6:
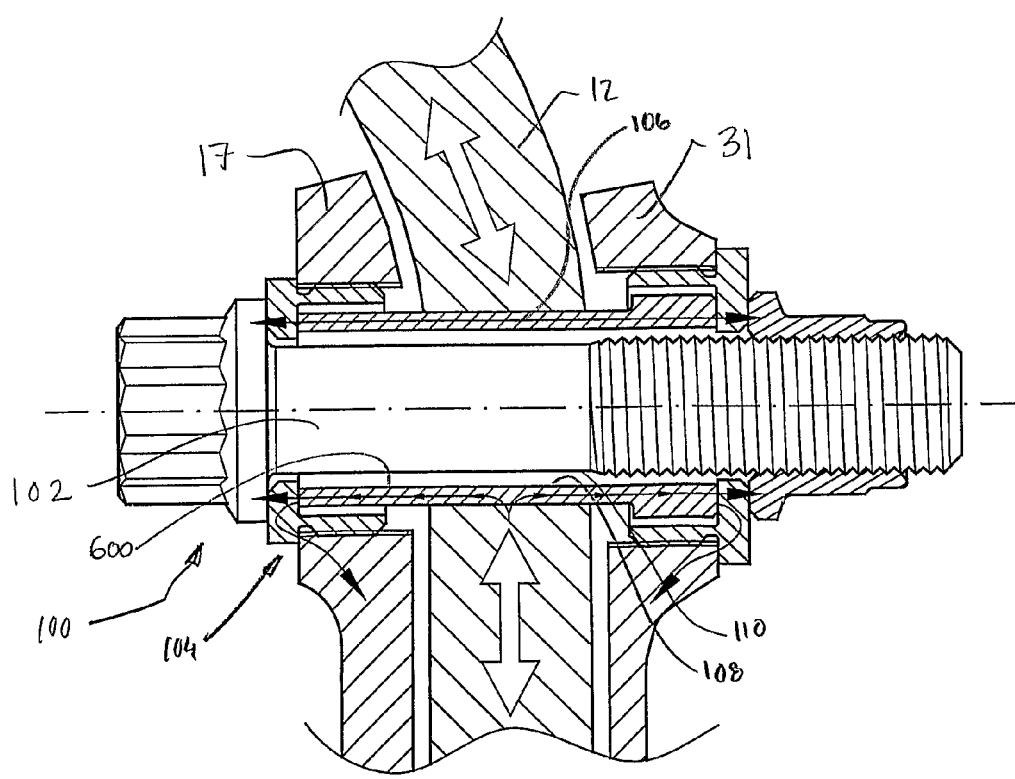

FIGS. 5-7 show an individual attachment point. A first hole 101 extends through a portion of the first member 12 (the vane) and a second hole 103 extends through a portion of the second member 17 (the outer stiffening structure). The first member and the second member are positioned such that the first hole 101 and the second hole 103 coincide. Further, a hole 120 extends through a portion of the support member 31, wherein the hole 120 coincides with the holes 101,103 in the first and second member. In other words, the holes are co-axially arranged. More specifically, there are a plurality of holes (three holes) in each of the first member 12, the second member 17 and the support member 31. Each set of coinciding holes forms an attachment point.

The support member 31 is positioned on an opposite side of the first member 12 relative to the second member 17 in an axial direction of the fastening element. The fastening device 100 comprises an elongated fastening element 102 in the form of a bolt arranged in said coinciding holes 101,103,120.

The fastening device 100 further comprises a bushing arrangement 104 arranged around the fastening element 102 and adapted to establish a load transmission path between the first member and the second member. A first part 106 (a first bushing) of the bushing arrangement is arranged such that an inner surface 108 thereof is positioned at a distance from an exterior surface 110 of the fastening element 102 for establishing a first load transmission path via the bushing arrangement and bypassing the fastening element 102 in a first load condition. The first bushing 106 is tubular and is arranged with a tight fit relative to the first member 12. Thus, the tubular bushing has an outer surface configured to engage with an interior wall defining the through hole in the first part for establishing the first load transmission path.

Thus, the inner surface of the tubular bushing is configured to engage with the bolt for establishing a second load transmission path between the first part and the second part via the bushing and the bolt in a second load condition, which is defined by a larger load than the first load condition.

The fastening device 100 is further adapted to allow the first member 12 to move relative to the fastening element 102 in a second load condition such that the first part 106 of the bushing arrangement can be brought into contact with the fastening element 102 for establishing a second load transmission path between the first member and the second member via the fastening element. The second load condition is defined by a larger load than in the first load condition. Especially, the first load condition defines a normal load case and the second load condition defines an ultimate load case.

Further, the bushing arrangement 104 comprises a second bushing 112 with a tight fit relative to the second member 17. The second bushing 112 is arranged in such a manner relative to the first bushing 106 that the first load transmission path extends through both of them in the first load case. More specifically, the second bushing 112 is positioned axially adjacent to the first bushing 106. The second bushing 112 is positioned in frictional contact with the first bushing 106 for movement in unison with the first bushing in the first load case. The first bushing 106 and the second bushing 112 are arranged such that a frictional resistance therebetween is exceeded in the second load case so that the first bushing moves relative to the second bushing. Further, the second bushing 112 is configured to contact a surface 114 of the second member 17 on an opposite side of the first member 12. Further, the second bushing 112 is arranged with an overlap relative to the first bushing 106 seen in a radial direction and wherein a portion 116 of the second bushing 112 is arranged at a distance A from the first bushing 106 in said radial direction. The second bushing is arranged in contact with the first bushing. The second bushing is configured to contact a surface of the first bushing facing in an axial direction of the bolt.

The fastening device 100 comprises means 118, in the form of a nut, for maintaining the first and second member 12, 17 in a desired relative position in an axial direction of the fastening element via engagement 102 with the fastening element (the threaded portion of the bolt). In other words, the fastening device comprises means for forcing the first and second member towards each other in an axial direction of the fastening element via engagement with the fastening element.

The first bushing 106 has a longer extension in an axial direction of the fastening element 102 than the first member 12 has. More specifically, the first bushing 106 extends a distance on either side of the first member 12.

The fastening device 100 is configured for maintaining the support member 31 in a desired position relative to the first member 12 in the axial direction. The support 31 member is formed by a metallic material.

The bushing arrangement 104 comprises a third bushing 122 with a tight fit relative to the support member 31. The third bushing 122 is arranged in such a manner relative to the first bushing 106 that the first load transmission path extends through both of them in the first load case. The third bushing 122 is positioned axially adjacent to the first bushing 106. The third bushing 122 is positioned in factional contact with the first bushing 106 for movement in unison with the first bushing in the first load case. The first bushing 106 and the third bushing 122 are arranged such that a factional resistance therebetween is exceeded in the second load case so that the first bushing moves relative to the third bushing. The third bushing is configured to contact a surface 124 of the support member 31 on an opposite side of the first member. A part 126 of the third bushing 122 is arranged with an overlap relative to the first bushing 106 seen in a radial direction and wherein the third bushing is arranged at a distance B from the first bushing in said radial direction. Further, the first bushing 106 is arranged at a distance C from the fastening element 102 for providing a play therebetween.

Each of the first, second and third bushing/sleeve has a cylindrical central bore, which is traversed by the bolt.

FIG. 6 shows the operation of the fastening device 100 in a first load case, which represents a normal load. The arrows 600 indicate a first load transmission path via the bushing arrangement 104 and bypassing the fastening element 102. This is accomplished in that the inner surface 108 of the first bushing 106 is maintained at a radial distance from the exterior surface 110 of the fastening element 102.

FIG. 7 shows the operation of the fastening device 100 in a second load case, which represents an extreme load. The arrows 700 indicate a second load transmission path via the bushing arrangement 104 and the fastening element 102. This is accomplished in that the inner surface 108 of the first bushing 106 is moved to contact with the exterior surface 110 of the fastening element 102. Thus, the first member (vane) 12 is moved relative to the fastening element (bolt) 102 to such an extent that the surfaces 108,110 contact.

Turning now to FIGS. 3-4 again, a second plate portion 33 of the support member 31 is positioned in a parallel relationship with the second wall portion 21 and secured to the second wall portion 21 via a plurality of similar fastening devices as has already been described above.

The component further comprises an inner stiffening structure 27. The inner stiffening structure 27 is preferably designed in a similar manner as the outer stiffening structure 17. The attachment of the load carrying vane to the inner stiffening structure 27 may be designed in a similar manner as has been described above for the outer stiffening structure 17 and will not be further described here.

It should be understood that the embodiment of the invention described is only an example of the invention and that alternative solutions within the scope of the invention as limited by the patent claims will be obvious for a person skilled in the art. Accordingly, the scope of protection is defined by the annexed patent claims, supported by the description and the annexed drawing. For example, it should be understood that the fibre plane of the composite material of the load carrying vane can be somewhat curved along the vane profile.

According to an alternative embodiment, the stiffening structure 17 forms an integral part of the ring 14. In other words, the stiffening structure forms the ring itself.

The invention has above been described for a static application in a gas turbine engine. However, the invention may also be applied in a rotational component, such as a fan and wherein there are provided aerodynamic guide vanes for the guiding of gases in a by pass channel of the engine. Especially, the invention may be used for any assembled/fabricated metal/composite structure.

However, in a broad sense, the invention relates to all kinds of structures in turbojet engines wherein there is a plurality of arms, typically vanes or load carrying vanes, connected to a ring element. For example, such structural vanes may be arranged in an engine core gas channel, but also in a fan section of an engine type where the fan section is arranged in a common gas channel upstream of a division into a core gas channel and a bypass gas channel.

The term "ring element", as referred to herein, may comprise only a part, i.e. a sector, of a ring, or a continuous full ring. Further, the ring element may form part of a housing, casing, or other similar component.

The invention claimed is:

1. A component comprising:
   a first member;
   a second member;
   a device for fastening the first member to the second member;
   a first hole extending through a portion of the first member;
   a second hole extending through a portion of the second member;
   the first member and the second member being positioned such that the first hole and the second hole coincide;
   the fastening device comprising an elongated fastening element arranged in the coinciding holes and a second fastening element movable relative to the elongated fastening element; and
   a bushing arrangement arranged around the elongated fastening element and adapted to establish a load transmission path between the first member and the second member;
   the bushing arrangement including a first bushing arranged in the first hole and having an exterior surface in a tight fit relative to the first member, and a second bushing arranged in the second hole in a tight fit relative to the second member, the second bushing having a central opening defining an interior surface of the second bushing and a flanged end defining a smaller opening than the central opening, the fastening device comprising a first clamping surface on the elongated fastening element, and a second clamping surface on the second fastening element that is adapted to be disposed at a plurality of different axial positions along the elongated fastening element relative to the first clamping surface, one of the first and the second clamping surfaces being arranged to apply a clamping force against the flanged end of the second bushing so that an axially inner surface of the flanged end of the second bushing is held in frictional contact with an axial outer end of the first bushing by the elongated fastening element, the first bushing comprising a second axial outer end, the other one of the first and second clamping surfaces applying a clamping force against the second axially outer end of the first bushing;
   wherein an inner surface of the first bushing is positioned at a distance from an exterior surface of the elongated fastening element, and the exterior surface of the first bushing and the interior surface of the second bushing define an annular gap so that a first load transmission path via the bushing arrangement and bypassing the elongated fastening element is established in a first load condition that is insufficient to overcome a frictional force established between the axial outer end of the first bushing and the axially inner surface of the flanged end of the second bushing by the clamping force, and, in a second load condition that is sufficient to overcome the frictional force established between the axial outer end of the first bushing and the axially inner surface of the flanged end of the second bushing by the clamping force, the first member moves radially relative to the elongated fastening element and the second bushing such that the first bushing contacts the elongated fastening element and establishes a second load transmission path between the first member and the second member via the elongated fastening element.

2. A component according to claim 1, wherein the second bushing is arranged in such a manner relative to the first bushing that the first load transmission path extends through both of them in the first load condition.

3. A component according to claim 1, wherein the fastening device comprises means for maintaining the first and second member in a desired relative position in an axial direction of the elongated fastening element via engagement with the elongated fastening element.

4. A component according to claim 3, wherein the elongated fastening element is formed by a bolt and that the second fastening element is formed by a nut.

5. A component according to claim 1, wherein the component comprises a support member for fastening the first member to the second member, wherein a hole extends through a portion of the support member, wherein the hole coincides with the holes in the first and second member, wherein the elongated fastening element is arranged also in the hole in the support member and wherein the support member is positioned on an opposite side of the first member relative to the second member in an axial direction of the elongated fastening element.

6. A component according to claim 5, wherein the support member is formed by a metallic material.

7. A component according to claim 5, wherein the bushing arrangement comprises a third bushing arranged in the support member hole with a tight fit relative to the support member.

8. A component according to claim 7, wherein the third bushing is arranged in such a manner relative to the first bushing that the first load transmission path extends through both of them in the first load condition.

9. A component according to claim 7, wherein the third bushing is positioned axially adjacent to the first bushing.

10. A component according to claim 7, wherein the other one of the first and the second clamping surfaces is arranged to apply a third bushing clamping force against an outer surface of a flanged end of the third bushing so that an axially inner surface of the flanged end of the third bushing contacts an axially outer surface of the first bushing to clamp the third bushing in frictional contact with the first bushing so that, in the first load condition, a frictional force between the first bushing and the third bushing is not exceeded and the third bushing moves in unison with the first bushing.

11. A component according to claim 10, wherein the third bushing clamping force clamps the first bushing and the third bushing so that the frictional force therebetween is exceeded in the second load condition so that the first bushing is movable relative to the third bushing.

12. A component according to claim 1, wherein the second member forms a portion of a ring element and wherein the first member forms an arm extending in a radial direction of the ring element.

13. A component according to claim 1, wherein it forms a gas turbine engine component.

14. Gas turbine engine comprising a component according to claim 1.

* * * * *